(12) United States Patent
Gelinas

(10) Patent No.: US 7,665,560 B2
(45) Date of Patent: Feb. 23, 2010

(54) DRIVETRAIN FOR HYBRID ELECTRIC VEHICLE

(75) Inventor: Christopher P. Gelinas, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 504 days.

(21) Appl. No.: 11/709,586

(22) Filed: Feb. 22, 2007

(65) Prior Publication Data
US 2008/0202829 A1    Aug. 28, 2008

(51) Int. Cl.
*B60K 6/36* (2007.10)

(52) U.S. Cl. .............. 180/65.6; 180/374; 903/909; 903/915; 74/606 R

(58) Field of Classification Search ............ 180/65.6, 180/65.7, 344, 374, 376, 377, 378; 903/909, 903/910, 915, 917, 918, 919; 74/606 R
See application file for complete search history.

(56) References Cited

U.S. PATENT DOCUMENTS

| | | | |
|---|---|---|---|
| 4,470,476 A * | 9/1984 | Hunt ................... 180/65.25 |
| 4,641,547 A | 2/1987 | Stich et al. |
| 5,404,772 A * | 4/1995 | Jester ................... 74/606 R |
| 5,907,970 A * | 6/1999 | Havlovick et al. ........... 74/16 |
| 6,000,296 A | 12/1999 | Sundquist |
| 6,208,036 B1 | 3/2001 | Evans et al. |
| 6,729,206 B2 * | 5/2004 | Hayabuchi et al. ........ 74/606 R |
| 6,843,749 B2 | 1/2005 | Kelledes et al. |
| 7,255,021 B2 * | 8/2007 | Reed et al. ............ 74/606 R |
| 7,575,088 B2 * | 8/2009 | Mir et al. ............... 180/300 |
| 2004/0116231 A1 | 6/2004 | Porter |
| 2005/0107198 A1 | 5/2005 | Sowul et al. |
| 2005/0173177 A1 | 8/2005 | Smith et al. |
| 2005/0217418 A1 | 10/2005 | Dismon et al. |
| 2006/0101645 A1 | 5/2006 | Stone |
| 2006/0169502 A1 | 8/2006 | Kano et al. |

* cited by examiner

*Primary Examiner*—S. Joseph Morano
*Assistant Examiner*—John D Walters
(74) *Attorney, Agent, or Firm*—David B. Kelley; MacMillan, Sobanski & Todd, LLC

(57) ABSTRACT

A drivetrain for a hybrid electric vehicle having a rear wheel drive configuration and a four wheel drive configuration is disclosed. Certain of the mounting flanges and input/output couplings are replicated between a transmission, a transfer case and an electric drive unit.

20 Claims, 4 Drawing Sheets

DRIVETRAIN FOR HYBRID ELECTRIC VEHICLE

BACKGROUND OF INVENTION

The present invention relates to a drivetrain for a hybrid electric vehicle.

In conventional automotive vehicles that include two wheel (rear wheel) drive and four wheel drive configurations, two different transmission configurations are employed-one for the two wheel drive configuration and one for the four wheel drive configuration. The two wheel (rear wheel) drive configuration of the transmission has an output shaft connecting to a U-joint of a drive shaft. The four wheel drive configuration of the transmission has an output end that mounts to an input end of a transfer case, with the output of the transfer case having an output shaft connecting to the U-joint of a shorter drive shaft.

More recently, a desire has arisen to provide hybrid electric automotive vehicles that allow for a two wheel (rear wheel) drive configuration and a four wheel drive configuration. In particular, there is a desire for a hybrid electric vehicle having an internal combustion engine driving a generally conventional transmission, with an electric drive unit downstream in the drivetrain from the transmission. Such a hybrid electric vehicle is desirable in both two wheel (rear wheel) drive and four wheel drive configurations, which can require multiple configurations for the various components in the drivetrain. For example, two different transmission configurations would be needed to accommodate both two and four wheel drive configurations (i.e., without and with a transfer case). And, the electric drive unit needs to be added and connected to the drivetrain in some way. Moreover, some of the underbody systems may need to be modified to allow for packaging of both of these configurations and the extra component. Many of these changes add extra cost and complexity to the various components and to their assembly into the drivetrain.

SUMMARY OF INVENTION

An embodiment contemplates a drivetrain for a hybrid electric vehicle having a rear wheel drive configuration and a four wheel drive configuration. The drivetrain may comprise a transmission having an output mounting flange; a transfer case having a transfer case input mounting flange operably mounted to the output mounting flange of the transmission, and a transfer case output mounting flange; and an electric drive unit having a drive unit input mounting flange that is operably mounted to the transfer case output mounting flange and replicates the transfer case input mounting flange.

An embodiment contemplates a drivetrain for a hybrid electric vehicle having a rear wheel drive configuration and a four wheel drive configuration. The drivetrain may comprise a transmission having an output mounting flange; a transfer case having a transfer case input mounting flange operably mounted to the output mounting flange of the transmission, and a transfer case output mounting flange that replicates the output mounting flange of the transmission; and an electric drive unit having a drive unit input mounting flange that is operably mounted to the transfer case output mounting flange.

An embodiment contemplates a drivetrain for a hybrid electric vehicle having a rear wheel drive configuration and a four wheel drive configuration, the drivetrain comprising an electric drive unit having a drive unit input mounting flange that is operably mountable to a transmission output mounting flange and a transfer case output mounting flange, an input coupling that is operably engageable with an output coupling of a transmission and an output coupling of a transfer case, and a rear end including a drive shaft mount.

An advantage of an embodiment is that the same transmission, with the same output mounting flange and output shaft, can be used for both a two wheel drive and a four wheel drive hybrid electric drive vehicle configuration. This reduces the cost and complexity associated with manufacturing the transmissions. Also, the same electric drive unit can be employed, with the same input and output mounting configurations, whether the vehicle is a two wheel drive or a four wheel drive version. Thus a reduction in the number of various components to support both two wheel drive and four wheel drive versions of a vehicle is achieved.

An advantage of an embodiment is that a forward drivetrain support cross member can support the electric drive unit in two wheel drive vehicle configuration, and the same cross member can be used to support the transfer case in a four wheel drive configuration. Then, only one additional cross member would be employed to support the electric drive unit in a four wheel drive configuration.

An advantage of an embodiment is that the electric drive unit can mount directly to the transmission (in a two wheel drive configuration) and directly to the transfer case (in a four wheel drive configuration), allowing for a reduced risk that the electric drive unit will interfere or cause packaging concerns with other vehicle systems, such as exhaust and fuel systems. Thus, any underbody re-design and packaging from a conventional vehicle configuration to hybrid vehicle configuration can be minimized.

DETAILED DESCRIPTION

Figure 1:
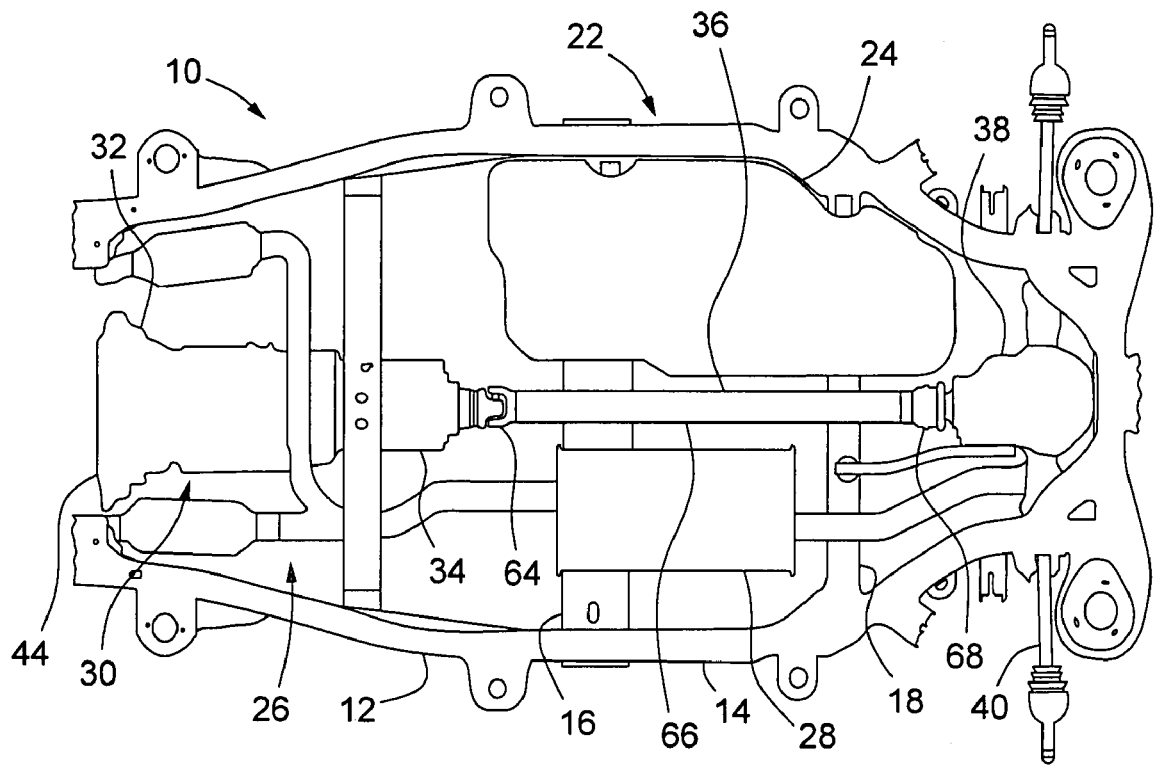
FIG. 1 is a schematic plan view looking up at a portion of a hybrid electric vehicle, with a drivetrain having a two wheel (rear wheel) drive configuration.
Figure 2:
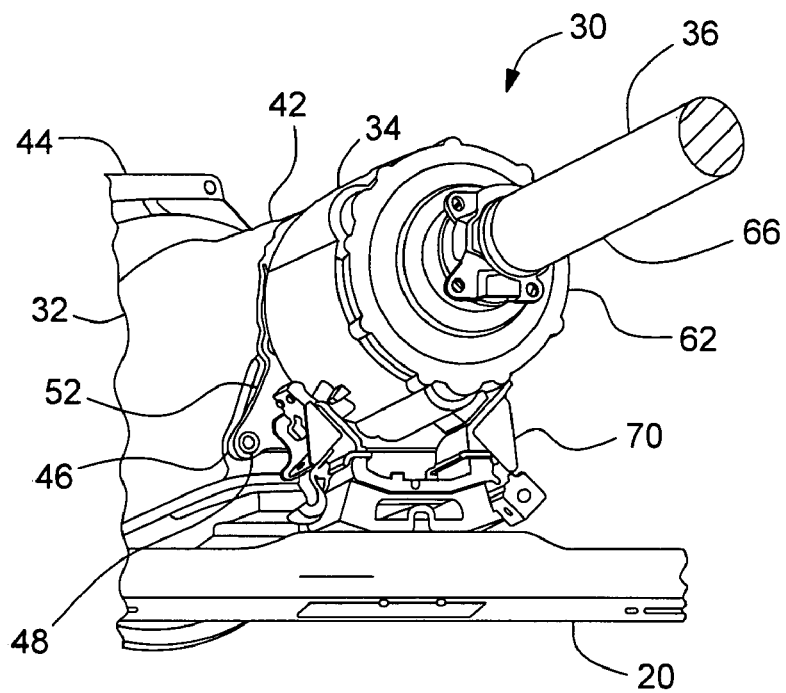
FIG. 2 is a schematic perspective view, on an enlarged scale, looking forward and upward at a portion of the two wheel drive drivetrain of FIG. 1.
Figure 3:
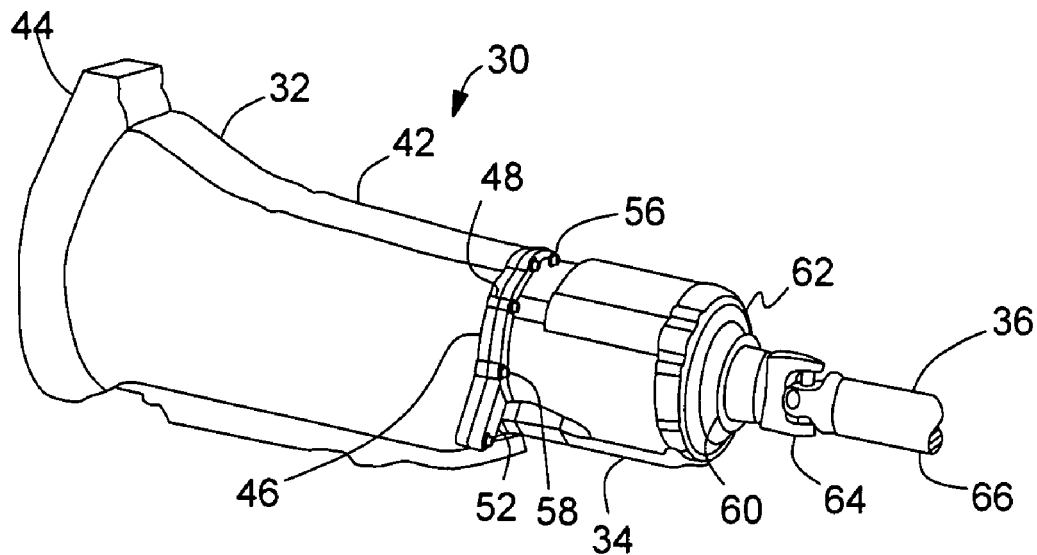
FIG. 3 is a schematic perspective view, on an enlarged scale, looking forward and downward at a portion of the two wheel drive drivetrain of FIG. 1.
Figure 4:
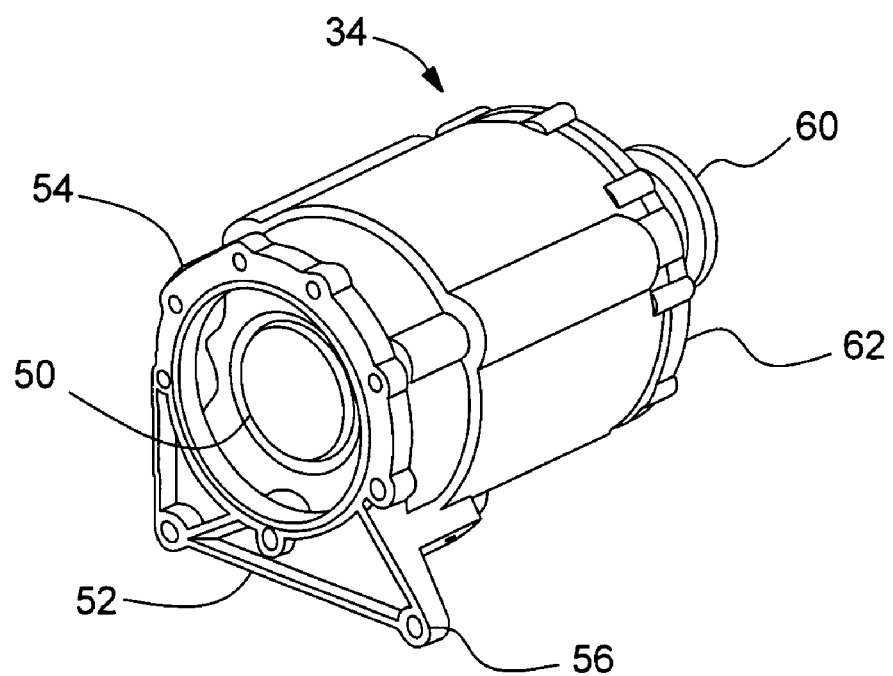
FIG. 4 is a schematic perspective view, looking down and aft, at an electric drive unit.

FIGS. 1-4 illustrate portions of a rear wheel (two wheel) drive vehicle 10, having a frame 12. The frame 12 may include frame rails 14 extending in 10 a generally fore-aft direction and frame cross members 16, 18. The frame 12 also includes a forward drivetrain support cross member 20. Other systems of the vehicle 10 that are illustrated include a portion of a fuel system, indicated generally at 22, which includes a fuel tank 24; an exhaust system, indicated generally at 26, which includes a muffler 28; and a drivetrain 30.

The drivetrain 30 includes an internal combustion engine (not shown) having an output (not shown) that provides a driving input torque to a transmission 32. The engine may be, for example, a conventional gasoline or diesel engine, or some other type of engine if so desired. The drivetrain 30 also includes an electric drive unit 34 connected to an output of the transmission 32, a two wheel drive driveshaft 36 connected to an output of the electric drive unit 34, a differential 38 connected to the downstream end of the driveshaft 36, and a rear axle assembly 40 that receives torque from the differential 38 and drives rear wheels/tires (not shown).

The transmission 32 is preferably a type that has gear sets similar to those of a conventional automatic transmission. Alternatively, the transmission may be a different type, such as, for example, a manual transmission or a continuously variable transmission. The transmission 32 has a main housing 42, which has a forward mounting flange 44 surrounding an input from a torque transfer device, such as, for example, a torque converter or clutch (not shown). The transmission 32 also has a rear mounting flange 46, including a fastener hole pattern 48 arranged to mate with other components. The rear mounting flange 46 surrounds an output shaft (not shown). The output shaft connects to an input coupling 50 of the electric drive unit 34.

The electric drive unit 34 includes a front (input) mounting flange 52 surrounding the input coupling 50. The front mounting flange 52 includes a sealing surface 54 and a fastener hole pattern 56. The sealing surface 54 mates with the rear mounting flange 46 of the transmission to seal between the two components. The fastener hole pattern 56 is a mirror image of the fastener hole pattern 48 of the transmission 32 so that they align, with a set of fasteners 58 extending through each of the corresponding fastener holes to secure the electric drive unit 34 to the transmission 32 via the two mounting flanges 46, 52. A forward mounting member 70 mounts between the electric drive unit 34 and the forward drivetrain support cross member 20, supporting the electric drive unit 34 on the cross member 20. A drive shaft mount 60 extends from a rear end 62 of the electric drive unit 34 and connects to a U-joint 64 of the two wheel drive driveshaft 36.

The driveshaft 36 has a main body 66 extending from the more forward U-joint 64 to a rear U-joint 68 that rotationally couples the main body 66 to an input of the differential 38. The differential 38, then, connects to the rear axle assembly 40 for transmitting a torque to the rear wheels/tires (not shown).

Figure 5:
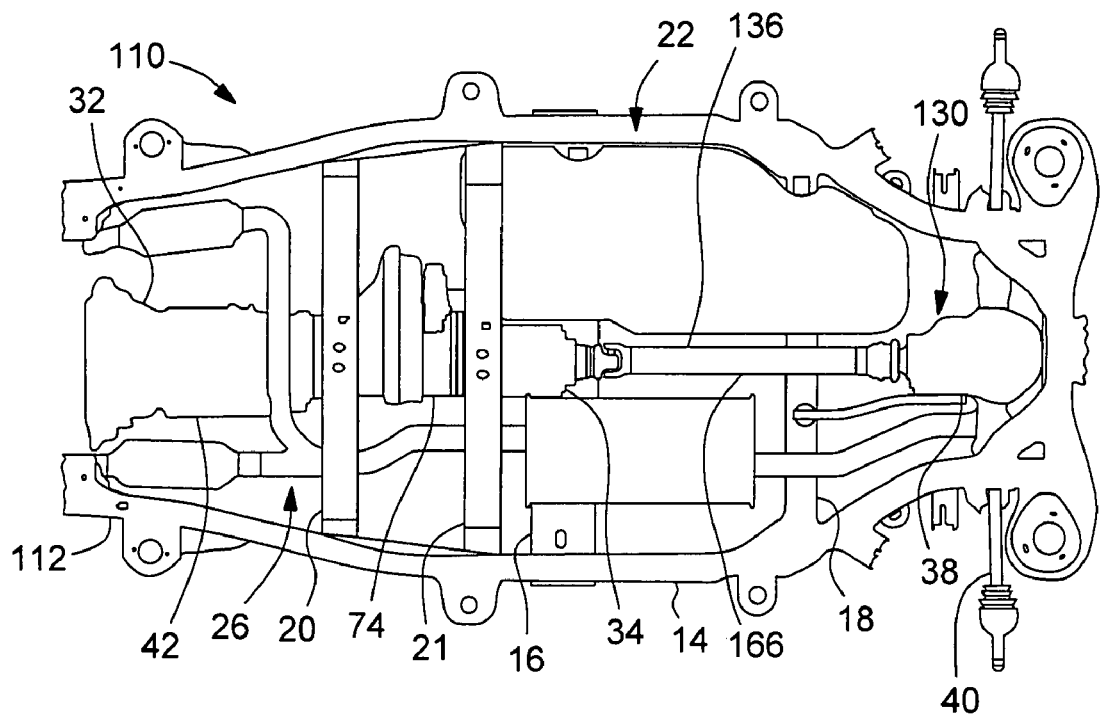
FIG. 5 is a schematic view similar to FIG. 1, but illustrating a four wheel drive configuration.
Figure 6:
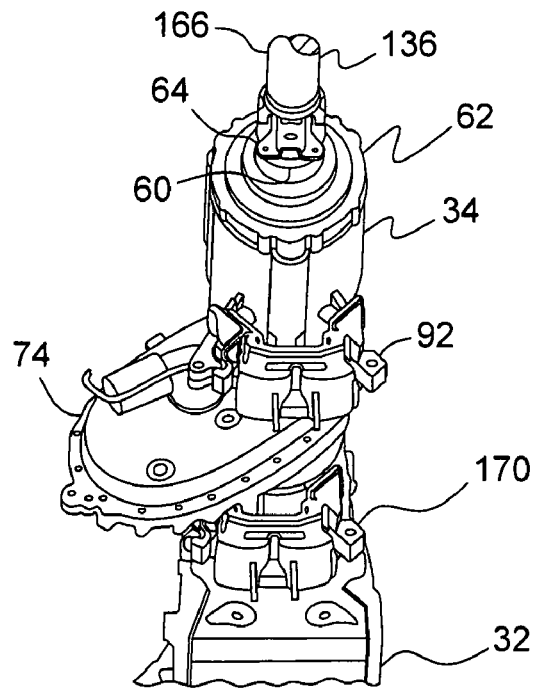
FIG. 6 is a schematic perspective view, on an enlarged scale, looking forward and upward at a portion of the four wheel drive drivetrain of FIG. 5.
Figure 7:
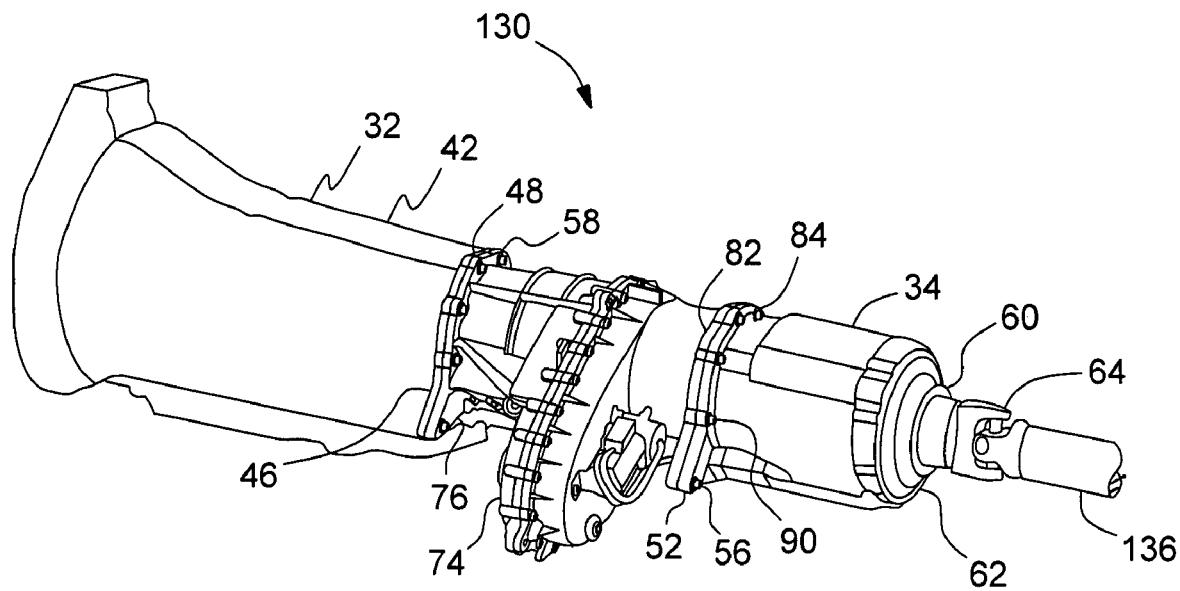
FIG. 7 is a schematic view similar to FIG. 3, but illustrating a four wheel drive configuration.
Figure 8:
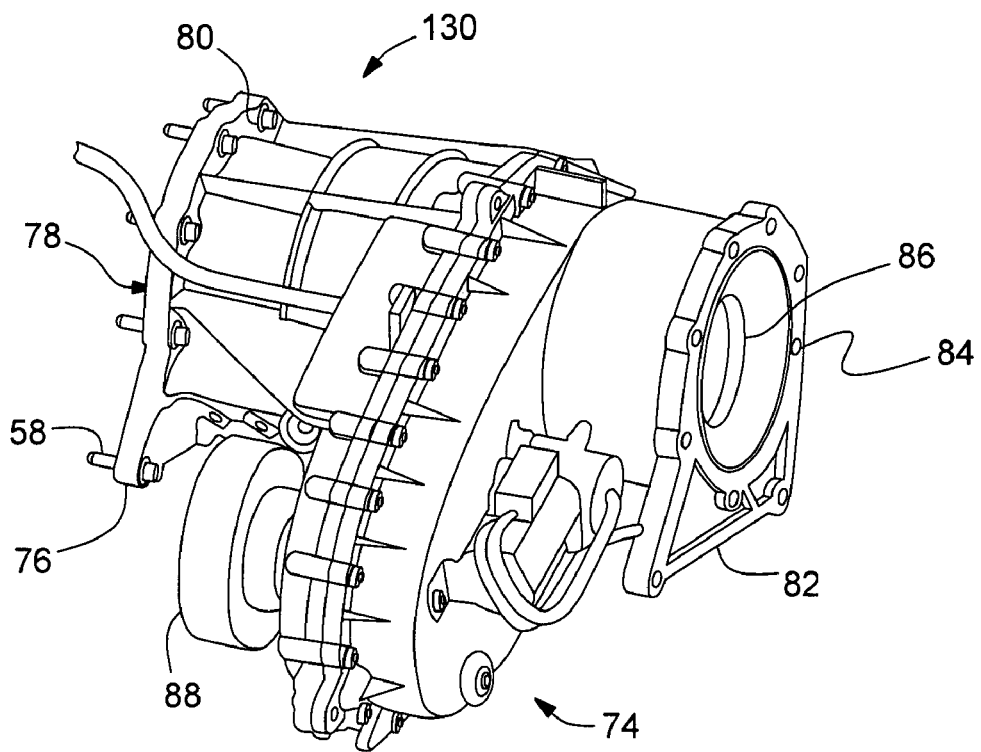
FIG. 8 is a schematic perspective view looking forward and downward at a transfer case.

FIGS. 5-8 illustrate portions of a four wheel drive vehicle 110, having a frame 112. For this four wheel drive version of the vehicle 110, elements that are the same as the two wheel drive version will have the same element numbers, while those that have changed will have a similar element number, but in the 100-series numbers.

The frame 112 may include the frame rails 14 and the frame cross members 16, 18. The frame 112 also includes the forward drivetrain support cross member 20 and a rear drivetrain support cross member 21. Other systems of the vehicle 110 may remain the same, including the fuel system 22 and the exhaust system 26.

The drivetrain 130 is now configured to provide four wheel drive. The drivetrain 130 still includes the internal combustion engine (not shown), the transmission 32, the electric drive unit 34, the differential 38 and rear axle assembly 40. The drivetrain 130 now also includes a transfer case 74, and a four wheel drive driveshaft 136 connected to the output of the electric drive unit 34.

The transmission 32 has the same main housing 42 as the two wheel drive configuration, with the same rear mounting flange 46 and fastener hole pattern 48. The rear mounting flange 46 surrounds the transmission output shaft (not shown), which now connects to an input coupling (not shown) of the transfer case 74. The input coupling of the transfer case 74 mates with the transmission output the same as the input coupling of the electric drive unit does in the two wheel drive configuration.

The transfer case 74 includes a front (input) mounting flange 76 surrounding the input coupling. The front mounting flange 76 includes a sealing surface 78 and a front fastener hole pattern 80. The sealing surface 78 mates with the rear mounting flange 46 of the transmission to seal between the two components. The front fastener hole pattern 80 is a mirror image of the fastener hole pattern 48 of the transmission 32 so that they align, with a set of fasteners 58 extending through each of the corresponding fastener holes to secure the transfer case 74 to the transmission 32. Thus, the front mounting flange 76 of the transfer case 74 replicates the front mounting flange 52 of the electric drive unit 34. A forward mounting member 170 mounts between the transfer case 74 and the forward drivetrain support cross member 20, supporting the transfer case 74 on the cross member 20. A side mount 88 couples to a front driveshaft (not shown) for providing torque to the front wheels (not shown).

The transfer case 74 also includes a rear (output) mounting flange 82, including a rear fastener hole pattern 84 arranged to mate with the electric drive unit 34 (discussed below). The rear mounting flange 82 surrounds an output coupling 86. The output coupling 86 connects to the input coupling 50 (shown in FIG. 4) of the electric drive unit 34. Thus, the rear mounting flange of the transfer case 74 replicates the rear mounting flange 46 of the transmission 32.

The electric drive unit 34 includes the same front (input) mounting flange 52 surrounding the input coupling 50. The front mounting flange 52 includes the sealing surface 54 (shown in FIG. 4) and fastener hole pattern 56. The sealing surface 54 mates with the rear mounting flange 82 of the transfer case 74 to seal between the two components. The fastener hole pattern 56 is a mirror image of the rear fastener hole pattern 84 of the transfer case 74 so that they align, with a set of fasteners 90 extending through each of the corresponding fastener holes to secure the electric drive unit 34 to the transfer case 74 via the two mounting flanges 86, 52. A rear mounting member 92 mounts between the electric drive unit 34 and the rear drivetrain support cross member 21, supporting the electric drive unit 34 on the cross member 21. The drive shaft mount 60 extends from the rear end 62 of the electric drive unit 34 and connects to a U-joint 64 of the four wheel drive driveshaft 136.

The four wheel drive driveshaft 136 has a main body 166 that is shorter than the two wheel drive driveshaft 36 in order to accommodate the insertion of the transfer case 74 into the drivetrain 130.

The terms "replicate" and "replicating" as used herein mean a geometric match in size and geometry that allows a first component to be substituted for a second component for mounting to a third component. That is, the part of the second component that is replicated from the first component would have similar elements, such as, for example, mounting holes of the same spacing and geometry as needed for mounting, housing flanges (mounting surfaces) that mate with the third component as needed for sealing and supporting the connection of the two components, common gaskets, and/or common hardware. More specifically, the input side (front) mounting flange 52 and the input coupling 50 of the electric drive unit 34 preferably replicates the input (front) side mounting flange 76 and the input coupling (not shown but matching the geometry of the input coupling 50 of the electric drive unit) of the transfer case 74. The output (rear) side mounting flange 82 and output coupling 86 of the transfer case 74 preferably replicates the output (rear) side mounting flange 46 and output shaft (not shown but matching the geometry of the output coupling 86 of the transfer case 74) of the transmission 32. Thus, the electric drive unit 34 is mounted directly to the output of the transmission 32 for two wheel drive configurations and mounts to the output of the transfer case 74 for four wheel drive configurations. One will note, then, that the transmission 32 and the electric drive unit 34 can be the same for both two (rear) wheel drive and four wheel drive configurations of the hybrid electric vehicles 10, 110, respectively.

While certain embodiments of the present invention have been described in detail, those familiar with the art to which this invention relates will recognize various alternative designs and embodiments for practicing the invention as defined by the following claims.

What is claimed is:

1. A drivetrain for a hybrid electric vehicle having a rear wheel drive configuration and a four wheel drive configuration, the drivetrain comprising:
   a transmission having an output mounting flange;
   a transfer case having a transfer case input mounting flange operably mounted to the output mounting flange of the transmission, a transfer case output mounting flange, and an output coupling that replicates an output coupling of the transmission; and
   an electric drive unit having a drive unit input mounting flange that is operably mounted to the transfer case output mounting flange.

2. The drivetrain of claim 1 wherein the transfer case input mounting flange includes a sealing surface and the drive unit input mounting flange includes a sealing surface that replicates the sealing surface of the transfer case input mounting flange.

3. The drivetrain of claim 2 wherein the transfer case input mounting flange includes a fastener hole pattern and the drive unit input mounting flange includes a fastener hole pattern that replicates the fastener hole pattern of the transfer case input mounting flange.

4. The drivetrain of claim 1 wherein the transfer case input mounting flange includes a fastener hole pattern and the drive unit input mounting flange includes a fastener hole pattern that replicates the fastener hole pattern of the transfer case input mounting flange.

5. The drivetrain of claim 1 wherein the transfer case output mounting flange replicates the output mounting flange of the transmission.

6. The drivetrain of claim 1 wherein the electric drive unit has an input coupling that replicates an input coupling of the transfer case.

7. The drivetrain of claim 1 wherein the drive unit input mounting flange replicates the transfer case input mounting flange.

8. The drivetrain of claim 1 wherein the electric drive unit has a rear end including a drive shaft mount, and wherein the drivetrain includes a driveshaft operatively engaging the drive shaft mount.

9. The drivetrain of claim 1 including a mounting member mounted under the electric drive unit and mountable on a drivetrain support cross member.

10. The drivetrain of claim 9 including a second mounting member mounted under the transfer case and mountable on a second drivetrain support cross member.

11. A drivetrain for a hybrid electric vehicle having a rear wheel drive configuration and a four wheel drive configuration, the drivetrain comprising:
    a transmission having an output mounting flange;
    a transfer case having a transfer case input mounting flange operably mounted to the output mounting flange of the transmission, and a transfer case output mounting flange; and
    an electric drive unit having a drive unit input mounting flange that is operably mounted to the transfer case output mounting flange and a rear end including a drive shaft mount, and wherein the drivetrain includes a driveshaft operatively engaging the drive shaft mount.

12. The drivetrain of claim 11 wherein the transmission output mounting flange has a fastener hole pattern and the transfer case output mounting flange has a fastener hole pattern that replicates the fastener hole pattern of the transmission output mounting flange.

13. The drivetrain of claim 11 wherein the transmission output mounting flange has a sealing surface and the transfer case output mounting flange has a sealing surface that replicates the sealing surface of the transmission output mounting flange.

14. The drivetrain of claim 11 wherein the transfer case has an output coupling that replicates an output coupling of the transmission.

15. The drivetrain of claim 11 wherein the transfer case output mounting flange replicates the output mounting flange of the transmission.

16. The drivetrain of claim 11 including a mounting member mounted under the electric drive unit and mountable on a drivetrain support cross member.

17. The drivetrain of claim 16 including a second mounting member mounted under the transfer case and mountable on a second drivetrain support cross member.

18. A drivetrain for a hybrid electric vehicle having a rear wheel drive configuration and a four wheel drive configuration, the drivetrain comprising: an electric drive unit having a drive unit input mounting flange that is operably mountable to a transmission output mounting flange and a transfer case output mounting flange, an input coupling that is operably engageable with an output coupling of a transmission and an output coupling of a transfer case.

19. The drivetrain of claim 18 wherein the electric drive unit has a rear end including a driveshaft mount and the drivetrain includes a driveshaft operatively engaging the drive shaft mount.

20. The drivetrain of claim 18 including a mounting member mounted under the electric drive unit and mountable on a drivetrain support cross member.

* * * * *